United States Patent
Nishikawa

(10) Patent No.: US 6,343,843 B1
(45) Date of Patent: Feb. 5, 2002

(54) PNEUMATIC TIRE AND WHEEL RIM

(75) Inventor: Masami Nishikawa, Osaka (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/632,800

(22) Filed: Aug. 4, 2000

(30) Foreign Application Priority Data

Dec. 28, 1999 (JP) .......................................... 11-374871

(51) Int. Cl.$^7$ .......................... B60B 19/00; B60B 17/00; B60C 5/00; B60C 11/00; D03D 27/00
(52) U.S. Cl. .................... 301/6.91; 152/450; 152/209.4; 295/7; 139/391; 428/92
(58) Field of Search ........................ 74/443; 152/339.1, 152/209.6, 153, 450, 110.1, 311, 209.4, 209.7; 301/6.91, 5.21, 5.22; 295/7; 139/391, 399; 428/85, 92, 94, 95

(56) References Cited

U.S. PATENT DOCUMENTS

| | | | | |
|---|---|---|---|---|
| 2,185,398 A | * | 1/1940 | Brunswick | 152/153 |
| 2,226,453 A | * | 12/1940 | Vretman | 152/339.1 |
| 3,047,285 A | * | 7/1962 | Gross | 152/450 |
| 3,414,036 A | * | 12/1968 | Skidmore | 152/153 |
| 3,513,061 A | * | 5/1970 | Vinicki | 139/399 |
| 3,513,062 A | * | 5/1970 | Vinicki | 139/399 |
| 4,381,026 A | * | 4/1983 | Skidmore | 152/153 |
| 4,381,805 A | * | 5/1983 | Troy | 139/391 |
| 4,392,522 A | * | 7/1983 | Bschorr | 152/341 |
| 4,399,851 A | * | 8/1983 | Bschorr | 295/7 |
| 4,755,006 A | * | 7/1988 | Clay et al. | 301/6.91 |

FOREIGN PATENT DOCUMENTS

JP 714682 2/1995

* cited by examiner

Primary Examiner—S. Joseph Morano
Assistant Examiner—Jason R. Bellinger
(74) Attorney, Agent, or Firm—Birch, Stewart, Kolasch & Birch, LLP

(57) ABSTRACT

A pneumatic tire, a wheel rim, and an assembly of a pneumatic tire and a wheel rim, which are provided with lawn-like materials for damping air resonance of the tire cavity are disclosed. An assembly of a pneumatic tire and a wheel rim where a foaming agent is injected into the tire cavity is also disclosed.

10 Claims, 12 Drawing Sheets

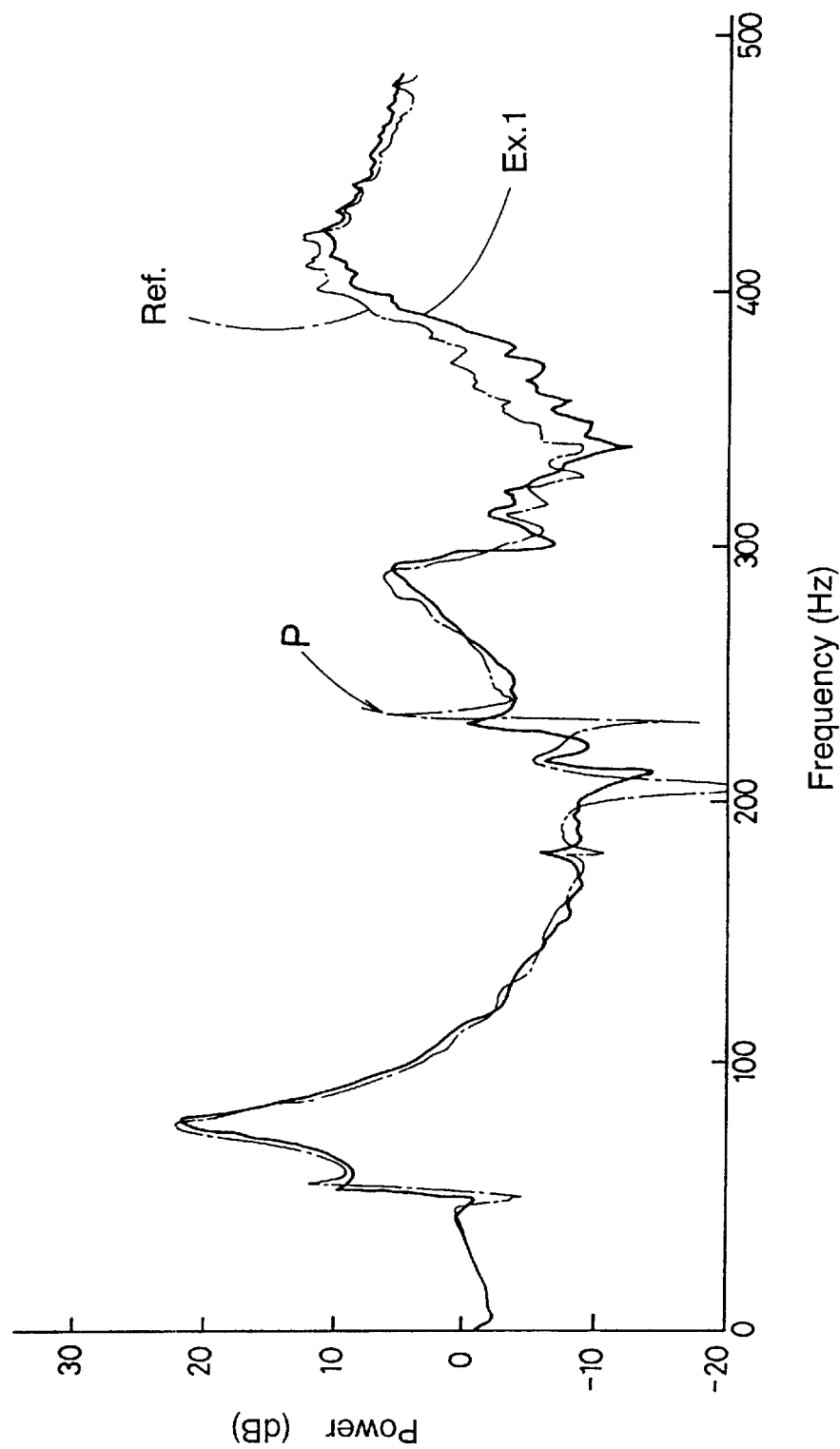

PNEUMATIC TIRE AND WHEEL RIM

The present invention relates to a pneumatic tire and a wheel rim, more particularly to an improved device to reduce a running noise due to air resonance in the tire cavity.

In recent years, as the noise of automobiles remarkably decreases, there is a strong demand for low noise tires. A pneumatic tire makes various types of noises. For example, a noise which is generated during running on rough asphalt roads and sounds as "GHO" in the inside of the car is called road noise. The frequency of the road noise ranges from 50 to 400 Hz, and the power spectrum thereof has a peak around about 250 Hz in case of passenger car tire size. This frequency corresponds to a primary mode of air resonance of the tire cavity around the tire circumference. It is possible to effectively reduce the road noise by controlling such air resonance of the tire cavity.

In the laid-open Japanese Patent application JP-A-63-137005, a tire and rim assembly is disclosed, wherein an elastic blocker is disposed in the tire cavity to prevent the air resonance. An example of the blocker is an elastic plate which extends into the tire cavity from its holder fixed to the wheel rim. Another example of the blocker is an elastic ball-like body put in the tire cavity. As the blocker occupies 40% or more of the cross sectional area of the tire cavity, it is difficulty to mount the tire on a wheel rim.

It is therefore, an object of the present invention to provide a pneumatic tire and a wheel rim in which the tire can be mounted on the wheel rim without difficulty and the tire cavity is prevented from air resonance to reduce the road noise.

According to one aspect of the present invention, a pneumatic tire comprises a tread portion, a pair of sidewall portions, a pair of bead portions, wherein lawn-like materials are provided on an inner surface of the tire.

According to another aspect of the present invention, a wheel rim for a pneumatic tire comprises a pair of bead seats for tire beads and a rim well therebetween for mounting the tire, wherein lawn-like materials are provided on a bottom of said rim well.

Embodiments of the present invention will now be described in detail in conjunction with the accompanying drawings.

FIG. 3 is a graph showing frequency spectrums of test tires obtained in an impact test.

Figure 1:
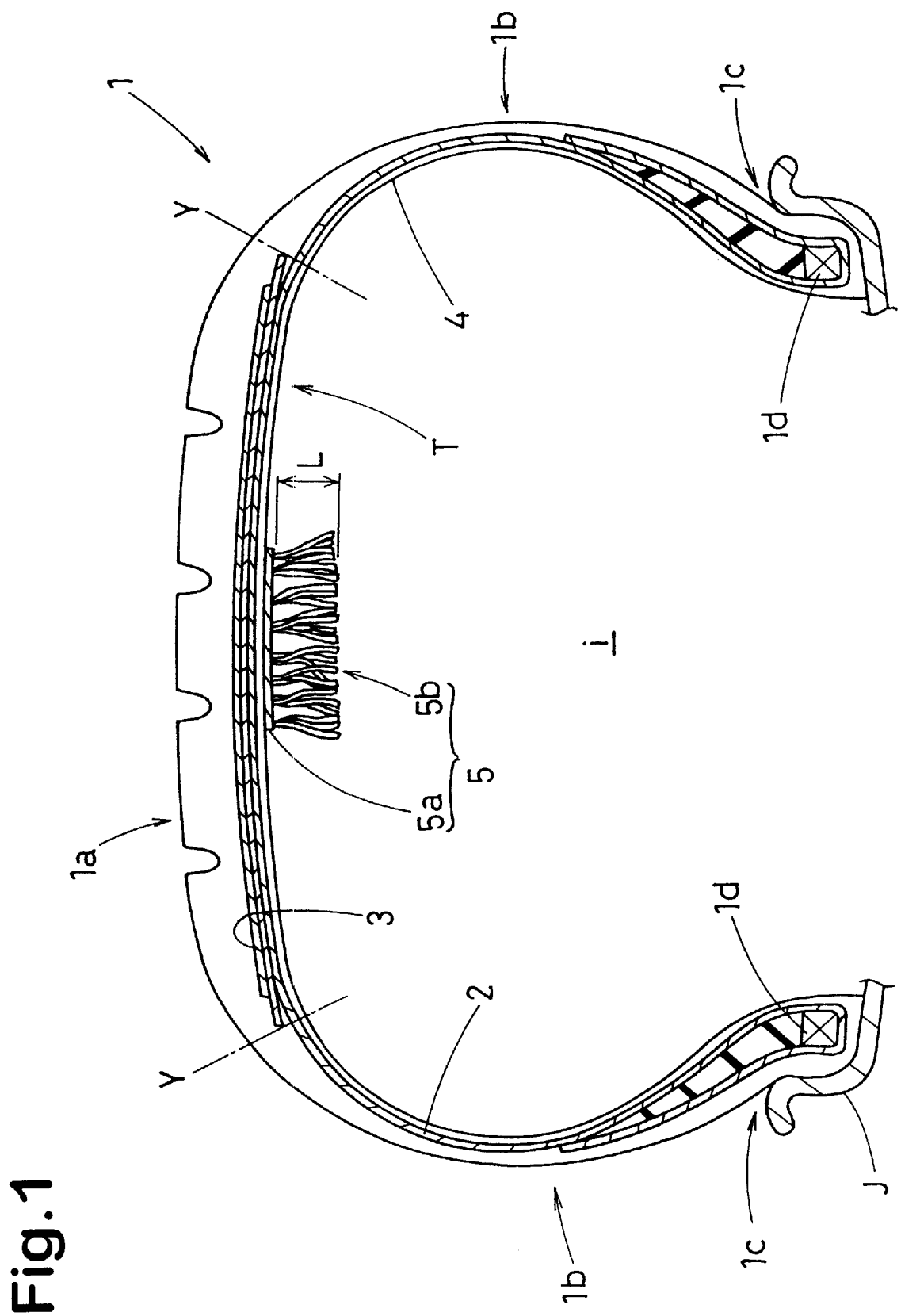
FIG. 1 is a cross sectional view of a pneumatic tire according to the present invention.

In the drawings, pneumatic tire 1 comprises a tread portion 1a, a pair of axially spaced bead portions 1c each with a bead core 1d therein, a pair of sidewall portions 1b extending therebetween, a carcass 2 extending between the bead portions 1c, and a belt 3 disposed radially outside the carcass 2 in the tread portion 1a. Wheel rim J comprises a pair of bead seats 11 for the tire bead portions, a rim well 12 therebetween for mounting the tire, and a flange 13 extending radially outwardly from the axially outer end of each bead seat 11.

In the embodiments shown in the figures, the tire 1 is a tubeless tire for passenger cars, and the carcass 2 comprises at least one ply of organic fiber cords, e.g. polyester, nylon, rayon and the like. The wheel rim J is a five-degree-taper rim where the bead seats 11 are tapered to accommodate to the bead portions of the tire for passenger cars.

When the tire 1 is mounted on the wheel rim J, a closed tire cavity (i) surrounded by the tire 1 and wheel rim J is formed. And a surface facing the tire cavity (i) is defined by the inner surface 4 of the tire 1 and a radially outer surface of the wheel rim J between the bead seats 11.

The surface facing the tire cavity (i) is provided with a lawn-like damper 5.

The lawn-like damper 5 comprises lawn-like materials 5b and a base 5a.

The lawn-like materials 5b are split yarns, or monofilament yarns, or a combination of split yarns and monofilament yarns, each having a flat sectional shape and made of an elastic synthetic resin, e.g. polypropylene, nylon, polyethylene, vinylidene chloride and the like. Each lawn-like material 5b can be straight or curl or loop.

The base 5a is made of a sheet of elastic material, e.g. polypropylene, polyester and the like.

The lawn-like materials 5b are bristled on one side of the base 5a so that the other side of the base 5a can be utilized to fix to the surface.

As to the method of fixing the lawn-like materials 5b to the base 5a, for example, (1) integral molding, (2) fusing, (3) press fitting (4) weaving, etc. may be used depending on the structure of the base and the materials used.

In the embodiments shown, an artificial lawn for used on sports grounds is utilized.

In FIG. 1, the lawn-like dampers 5 are disposed on the inner surface 4 of the pneumatic tire 1.

In this example, the lawn-like dampers 5 are disposed in a tread region T, especially within a region between lines Y and Y drawn normal to the inner surface 4 passing the edges of the belt 3 because it is effective in controlling the resonance. But, the lawn-like dampers 5 may be disposed in the sidewall portion and/or bead portion too.

Figure 2:
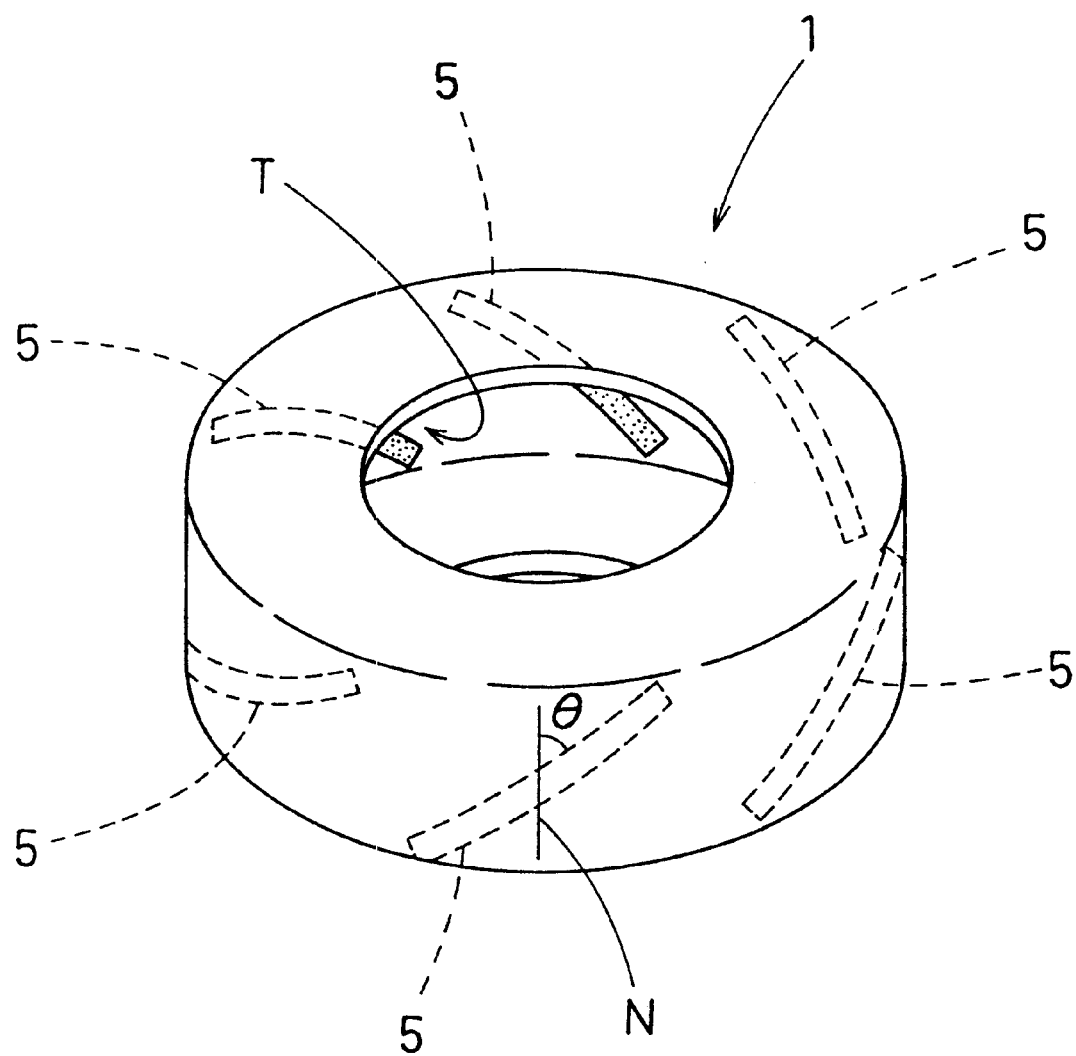
FIG. 2 is a schematic perspective view of the pneumatic tire showing an example of the lawn-like damper arrangement.

In FIG. 2, the lawn-like dampers 5 are provided as strips (six strips) disposed at regular pitches in the tire circumferential direction, inclining at the same angles θ (θ>0) with respect to the tire axial direction N.

The dampers 5 are fixed to the tire inner surface by means of an adhesive agent or a pressure sensitive adhesive double coated tape.

In this example, a plurality of dampers 5 are discontinuously provided around the tire. But, it may be possible to provided a long strip around the tire continuously in the tire circumferential direction.

The lawn-like materials 5b have an average length L in the range of from 10 to 45 mm, preferably 20 to 40 mm, more preferably 25 to 30 mm.

A bristle density, which is defined as the weight in kg of the lawn-like materials 5b per a unit area (one square meter)

of the base 5a, is set in the range of from 0.5 to 1.5 kg/sq.m, preferably 0.8 to 1.0 kg/sq.m.

The strength of a lawn-like material 5b is set in the range of from 6700 to 11000 dex.

Therefore, the tire 1 can be mounted on the wheel rim J in the same manner as in the conventional pneumatic tire although the tire 1 is provided with the dampers 5.

Comparison Test 1:

Test tires of size 195/65R15 having the same basic tire structure shown in FIG. 1 except for the lawn-like dampers were made and tested as follows, wherein Ex.1 tire had the structure shown in FIG. 2, that is, six strips (16 mm×220 mm) of artificial lawn (split yarns) were fixed to the inner surface of the tread portion at the same circumferential pitches and at the angle θ of 45 degrees, and Ref. tire was the same as Ex.1 except that the strips were not provided.

Impact Test:

The test tire was mounted on a standard wheel rim of size 15X6JJ and inflated to 200 kPa, and the vibration when a certain impact was given to the tread surface was measured on the axis to obtain frequency spectrums.

The frequency spectrums are shown in FIG. 3, wherein Ref. tire shown a sharp peak P at about 230 Hz due to the air resonance of the tire cavity. In Ex.1 tire, however, the peak became dull, and further, the vibration was greatly decreased in a band from about 300 to 400 Hz. (max. 5 or 6 dB decreased)

Replica Road Test:

The test tire mounted on a 15X6JJ wheel rim and inflated to 200 kPa was coasted on a replica road in a speed range of from 60 to 30 km/hr under a tire load of 4.41 kN. And the vibrations were measured on the axis to obtain frequency spectrums.

Figure 4A:
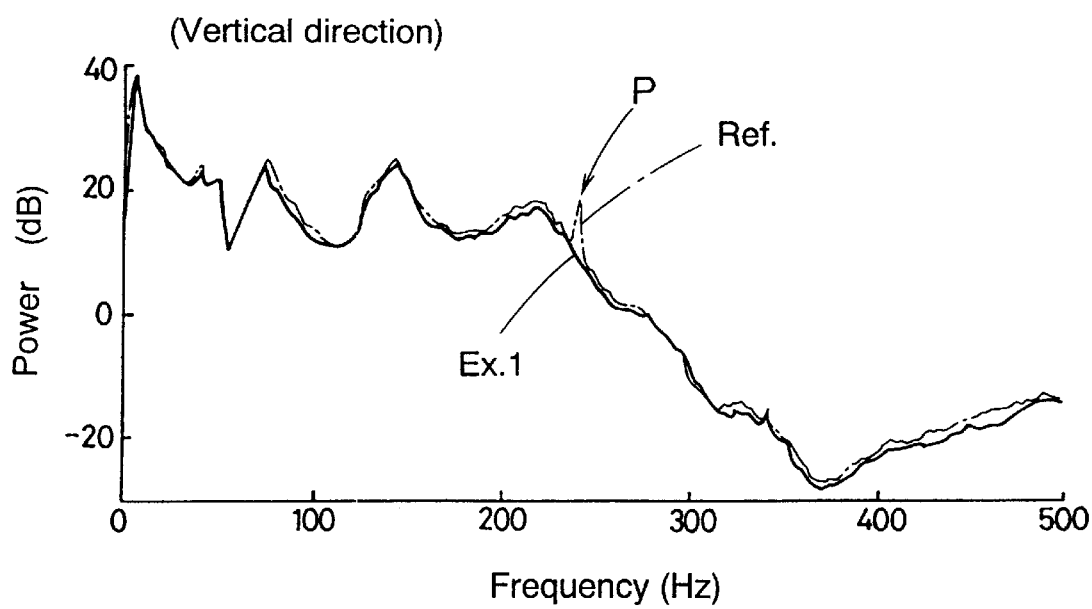
FIGS. 4A and 4B are graphs showing frequency spectrums of the test tires obtained in a replica road test.
Figure 4B:
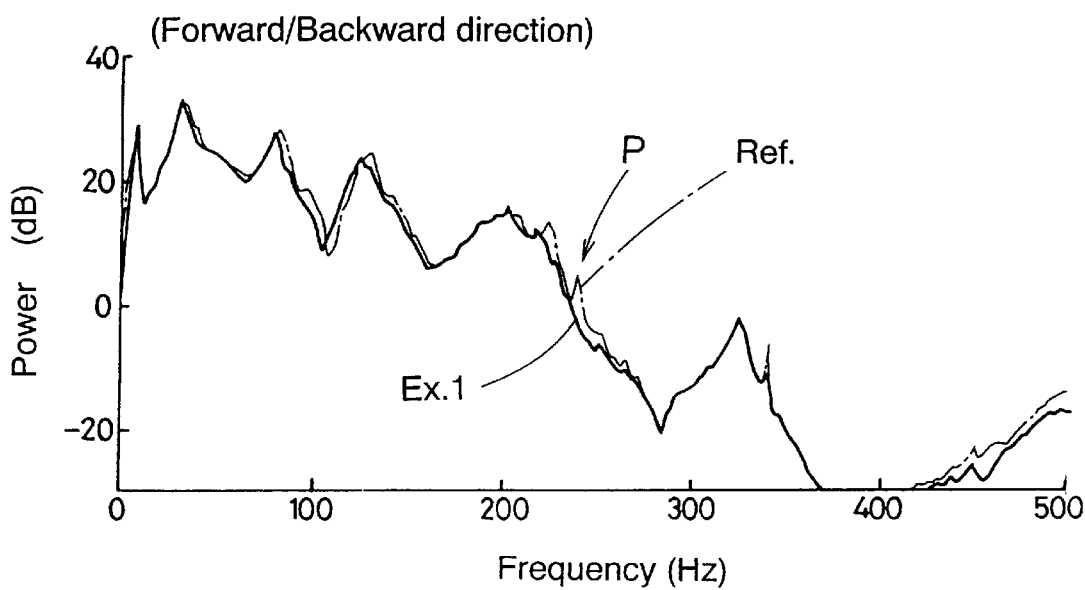

The frequency spectrums on the vertical direction are shown in FIG. 4A. The frequency spectrums on the forward and backward direction are shown in FIG. 4B. In Ref. tire, a peak P occurred at about 230 Hz due to the air resonance of the tire cavity. In Ex.1 tire, however, the peak completely disappeared.

From the test results, it was confirmed that the lawn-like dampers effectively function as a noise damper.

Figure 5:
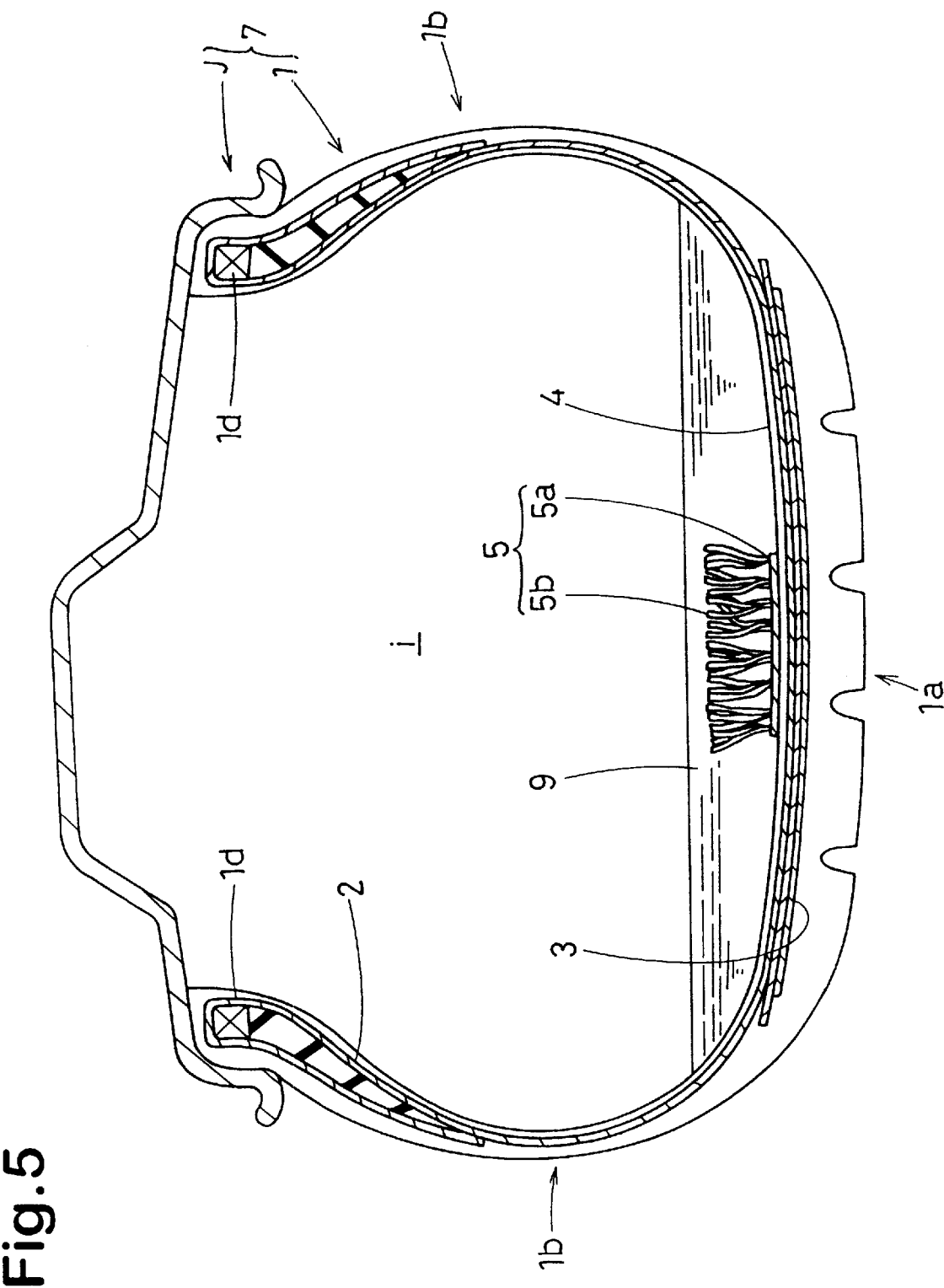
FIG. 5 is a cross sectional view a tire and wheel rim assembly according to the present invention.

Next, another effective usage of the above-explained tire is described in accordance with FIG. 5.

FIG. 5 shows an assembly 7 of the pneumatic tire 1 and wheel rim J, wherein the tire 1 is mounted on the wheel rim J, and a liquid foaming agent 9 is poured into the tire cavity (i) through the tire valve (not shown).

For the foaming agent 9, surface active agents can be used. Especially, a surface active agent such that the hydrophobic group thereof forms a long straight chain and the hydrophilic group thereof is not large and exists at an end of the chain is preferably used because it is easy to foam up. To put it more concretely, it is preferable to use at least one kind of anionic surface active agents, e.g. carboxylic acid surface active agents, sulfonic acid surface active agents, sulfuric ester surface active agents, phosphoric acid ester surface active agents and the like. Further, nonionic surface active agents, amphoteric surface active agents and the like can be used aside from the anionic surface active agents. Furthermore, various chemical agents may be used as far as they can easily form up.

The foaming agent 9 is preferably used together with a foam stabilizer in order to produce foam B of long duration.

For the foam stabilizer, proteins, hydrophilic macromolecular substances and the like, such as amides, hydroxylammonium, amine oxide, fatty polyhydric alcohol ester, albumin and the like can be used.

The volume of the foaming agent 9 and optional foam stabilizer is determined such that, when the tire cavity (i) is filled with foam B, the foaming agent 9 remaining in a form of liquid becomes almost zero.

Figure 6A:
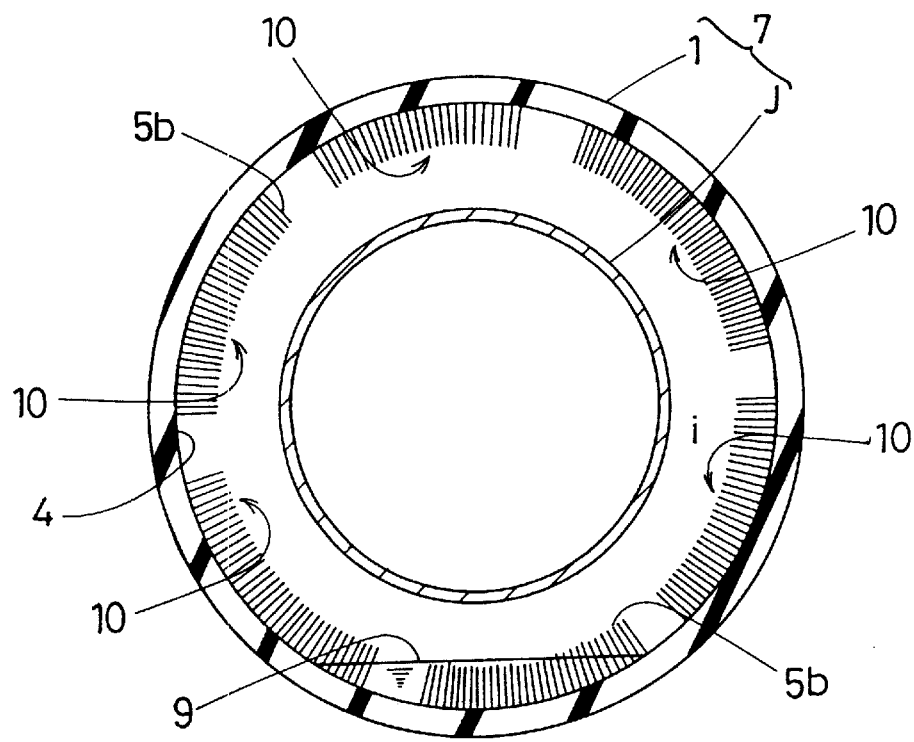
FIGS. 6A and 6B are schematic cross sectional views of the assembly showing states before and after the foaming agent foams up.
Figure 6B:
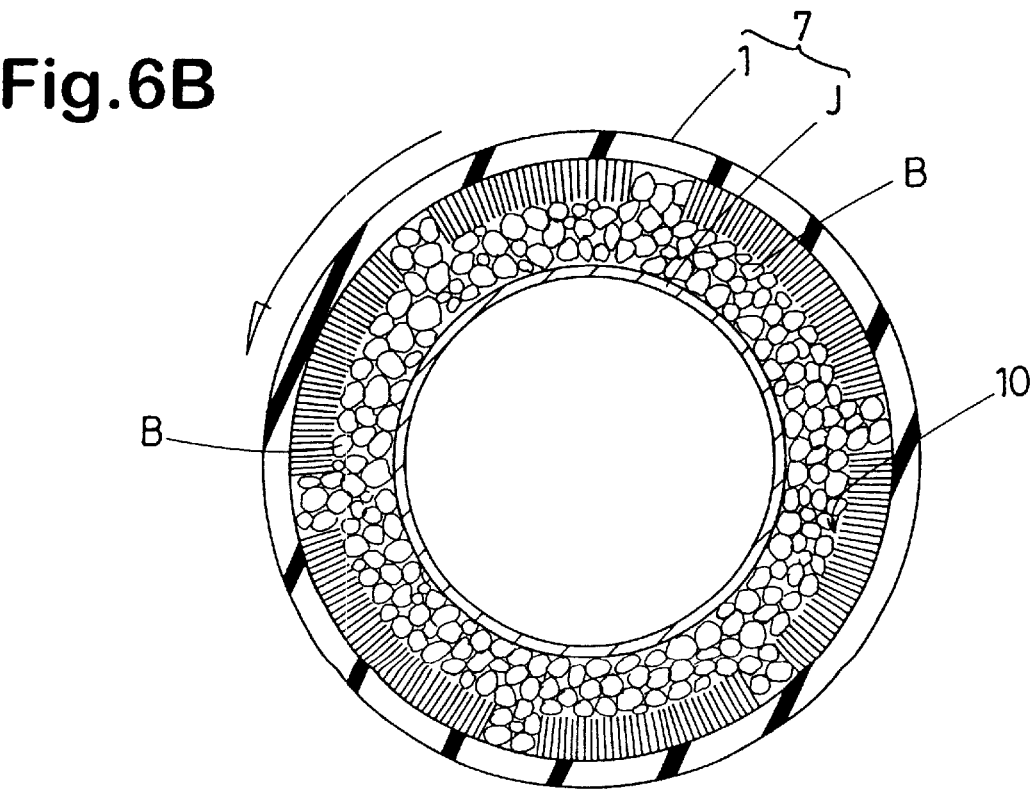

As shown in FIG. 6A, when the tire is not rotated, the foaming agent 9 stays in the bottom of the tire cavity. But, during the tire rotates, the foaming agent 9 foams up, and the tire cavity fill up with foam B. Here, the lawn-like materials 5b also function as a foam promoter. Further, the lawn-like materials 5b can prolong the duration of the foam B.

In view of these functions, it is preferable that the strip-like dampers 5 are inclined at the angles θ in the range of from 30 to 60 degrees. (see FIG. 2)

Comparison Test 2:

The above-mentioned impact test and replica road test were conducted with respect to the following assemblies: Ex. 2 wherein the dampers were not provided, but the foaming agent was poured into the tire cavity; Ex. 3 wherein the dampers and foaming agent were provided as explained above; and Ref. wherein the dampers and foaming agent were not provided.

For the foaming agent, a commercially obtainable shampoo containing 15% of a surface active agent was used. The volume was about 500 cc.

Figure 7:
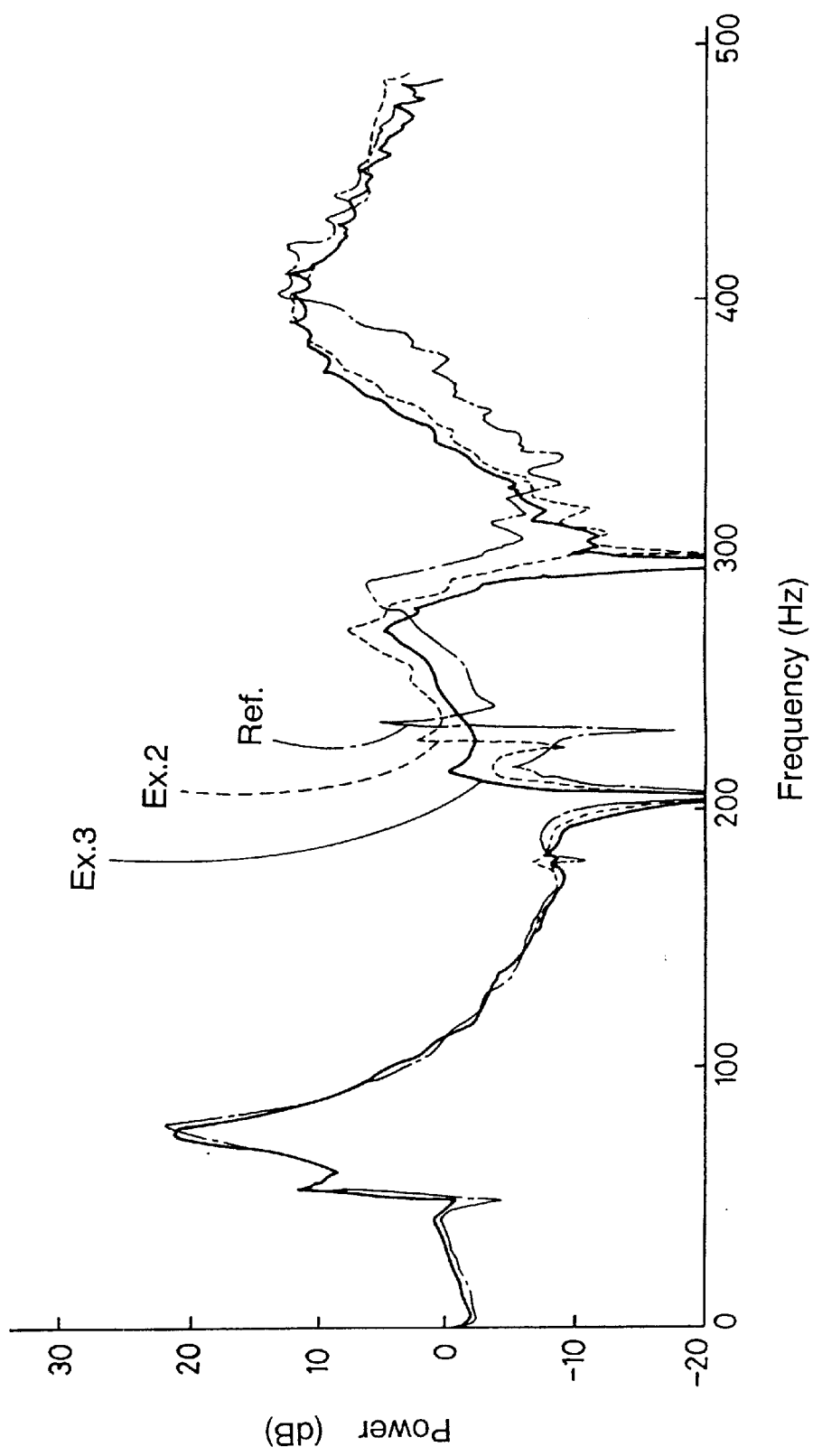
FIG. 7 is a graph showing frequency spectrums of test tires obtained in an impact test.
Figure 8A:
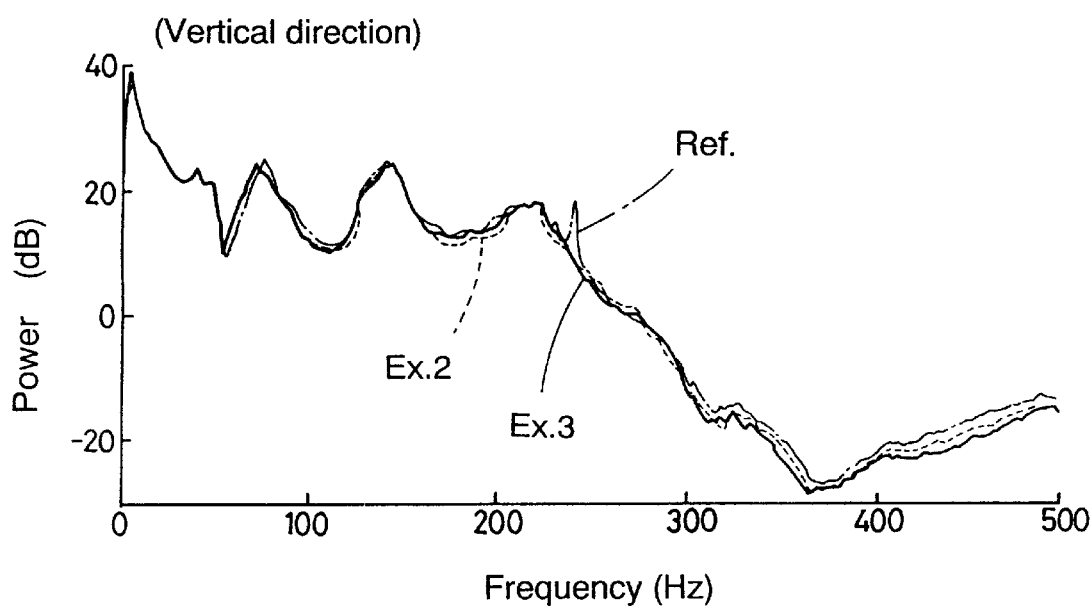
FIGS. 8A and 8B are graphs showing frequency spectrums of the test tires obtained in a replica road test.
Figure 8B:
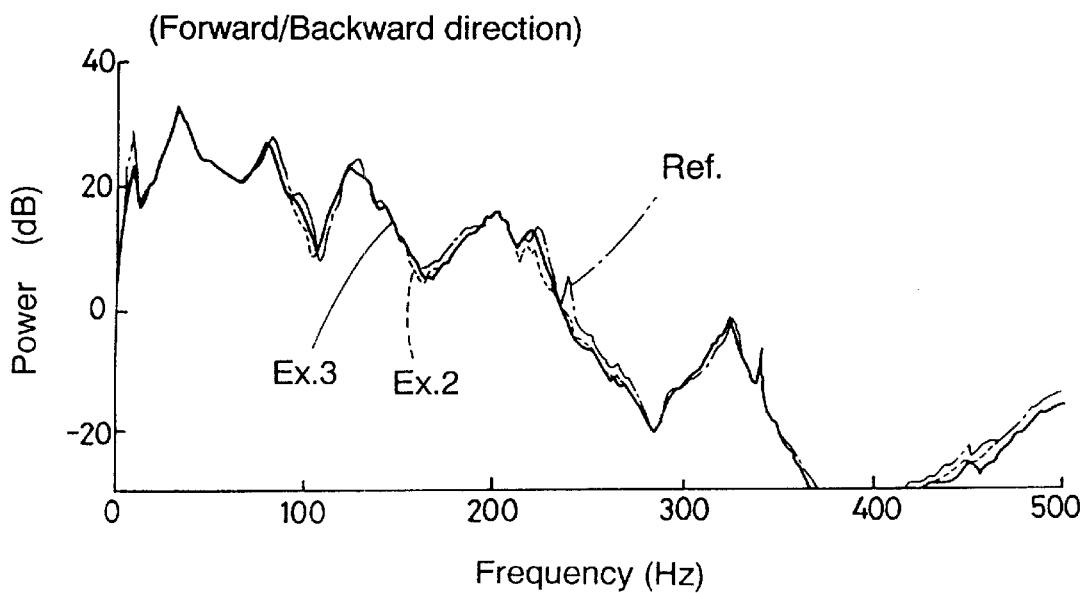

The results of the impact test are shown in FIG. 7. The results of the replica road test are shown in FIGS. 8A and 8B.

From the test results, it was confirmed that, owing to the foam, Ex.2 and Ex.3 can be effectively decreased in the air resonance.

Form the former Comparison test 1 and this Comparison test 2, it was confirmed that the lawn-like damper alone is effective, the foaming agent alone is also effective, but the combination of the lawn-like damper and foaming agent is most effective in reducing the road noise.

Figure 9:
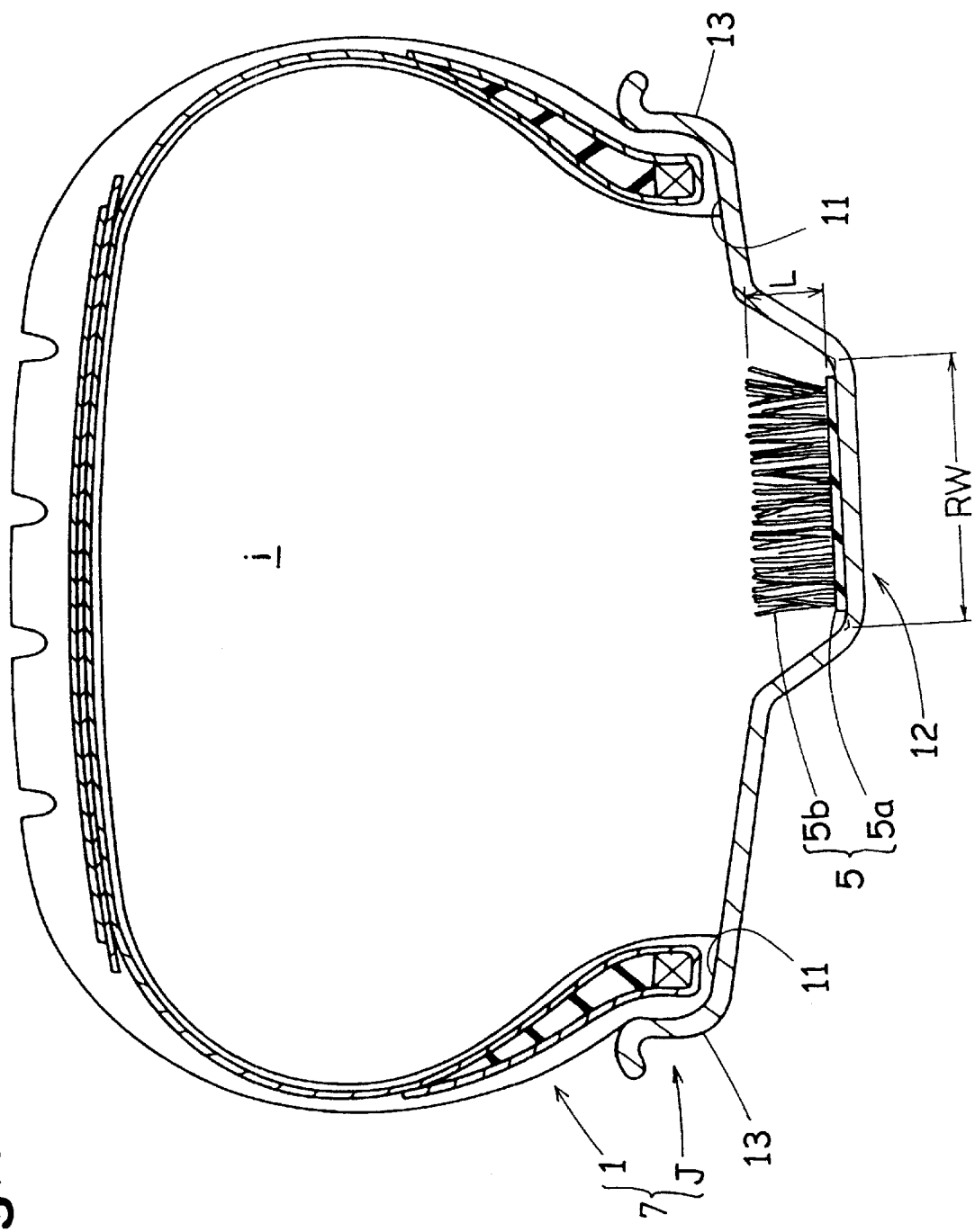
FIG. 9 is a cross sectional view of a tire and wheel rim assembly according to the present invention.

FIG. 9 shows a tire and wheel rim assembly, in which the lawn-like damper or dampers 5 are disposed on the bottom of the rim well 12 of the wheel rim J.

In this case, the average length L of the lawn-like materials 5b is set in the range of from 10 to 45 mm, preferably 15 to 45 mm, more preferably 15 to 30 mm. The bristle density, the strength of each lawn-like material 5b, the materials of the lawn-like damper 5 are determined in the same manner as the former examples. Preferably, the total area where the lawn-like materials 5b are provided is set in the range of from 24 to 220 sq.cm.

Figure 10:
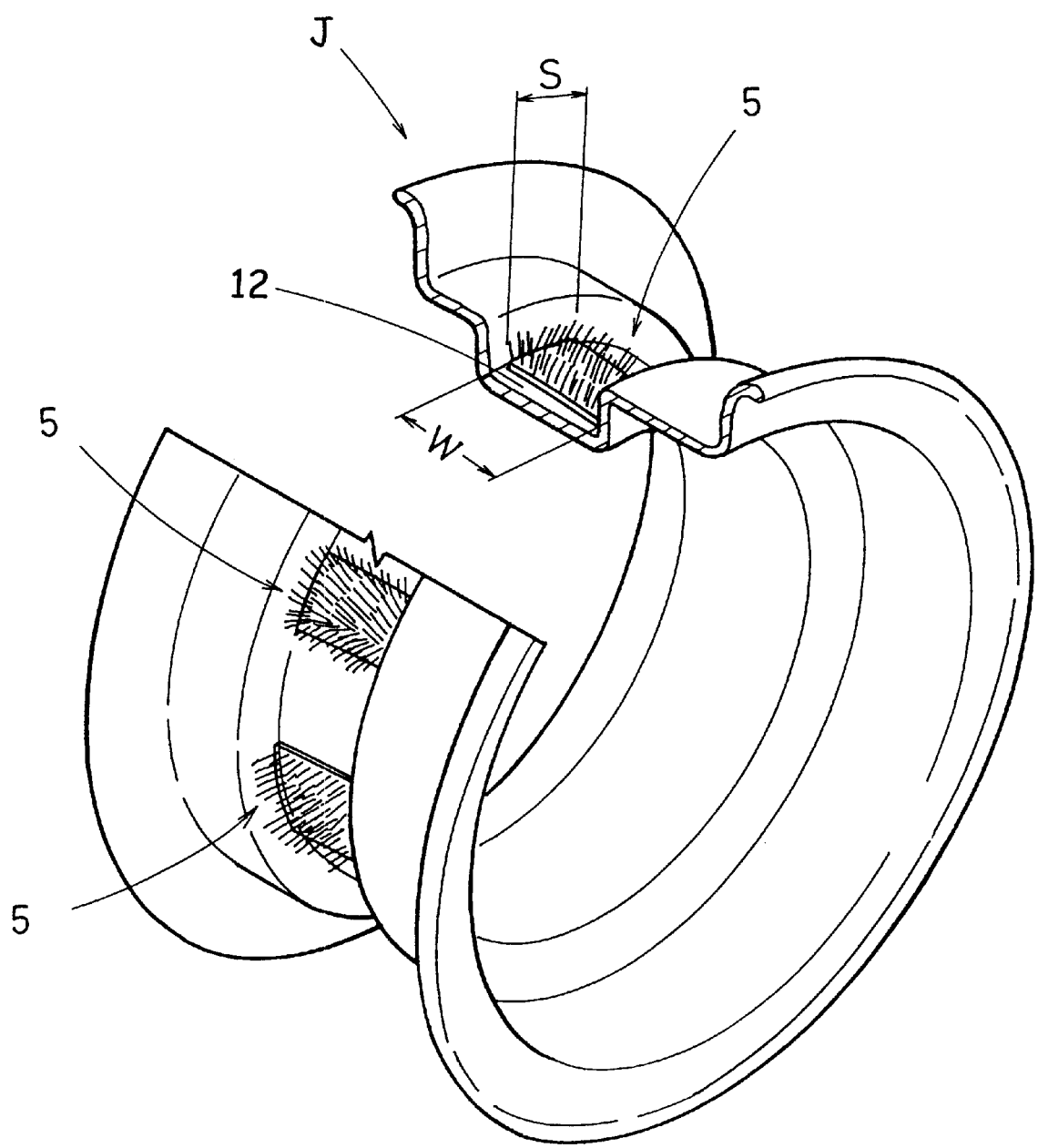
FIG. 10 is a perspective view of the wheel rim thereof.
Figure 11:
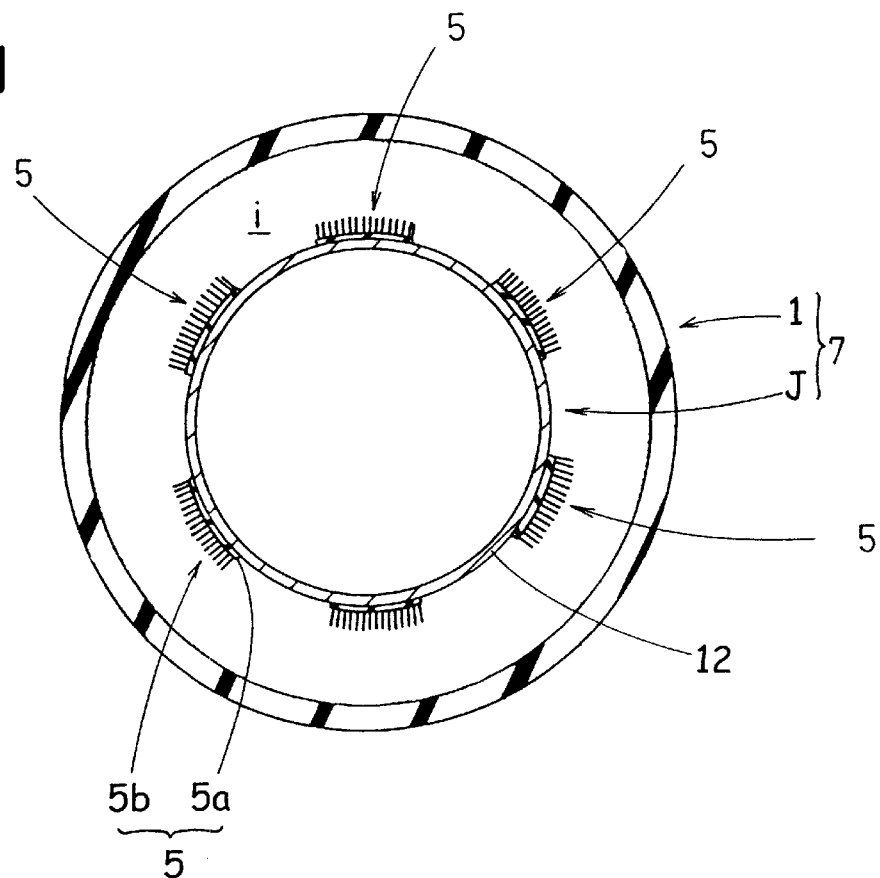
FIG. 11 is a schematic cross sectional view of the assembly showing the arrangement of lawn-like dampers.

FIGS. 10 and 11 show an example in which a plurality of lawn-like dampers 5 having an identical size and shape are arranged at regular intervals in the circumferential direction. The number of the dampers is in the range of from 4 to 12, and the circumferential length S of each damper is in the range of from 15 to 30 mm.

Figure 12:
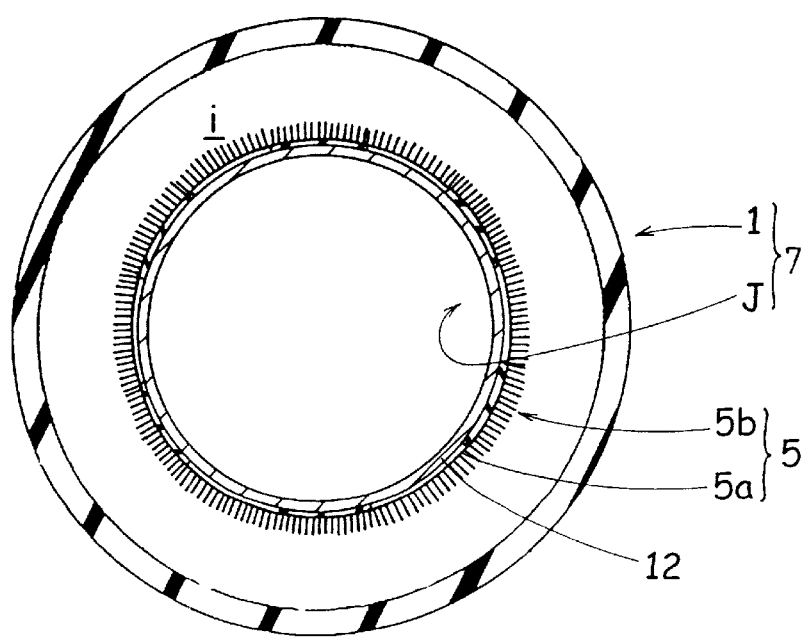
FIG. 12 is a schematic cross sectional view showing another example of the lawn-like damper arrangement.
Figure 13:
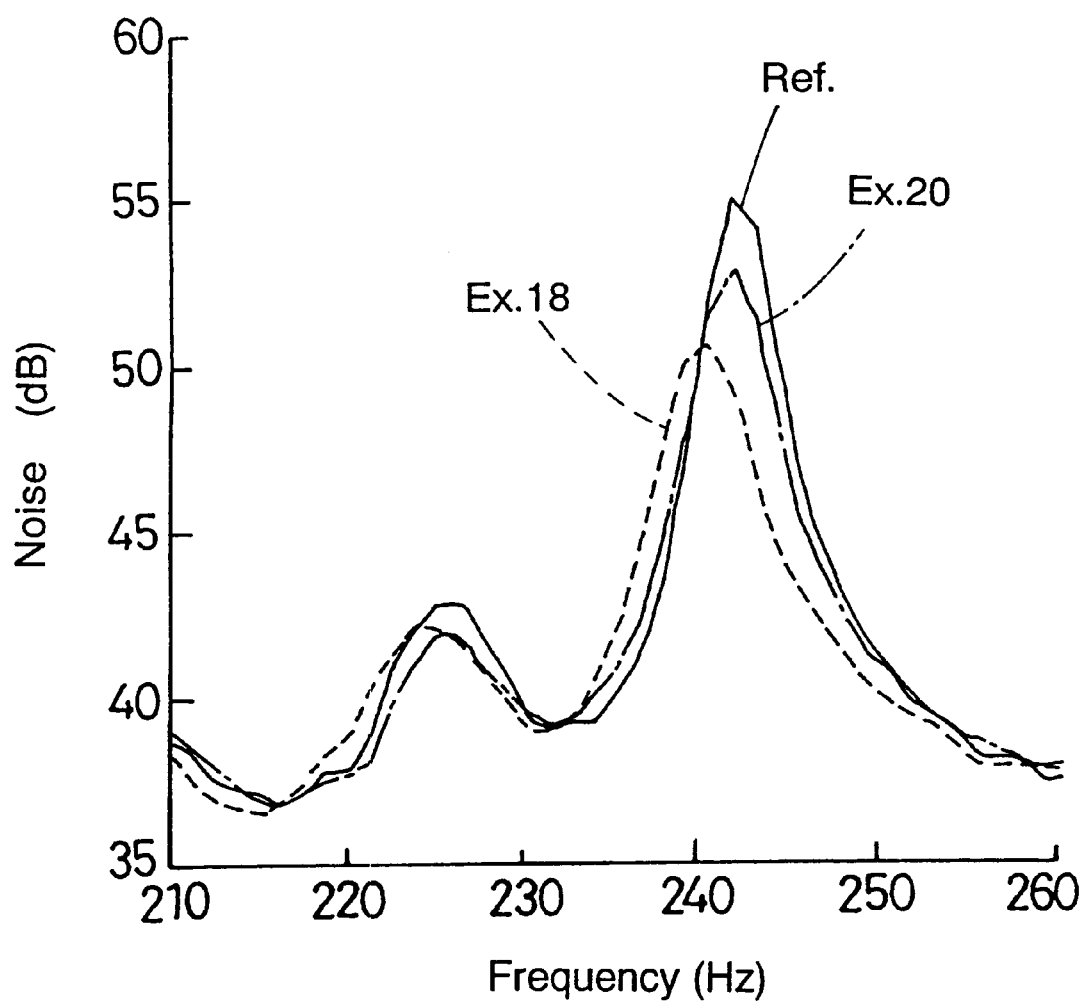
FIG. 13 is a graph showing test results of an inside noise test.

FIG. 12 shows an example in which the lawn-like damper 5 is a continuous strip extending around the wheel.

In either case, the axial width W of the damper 5 is set in the range of from 60 to 170%, preferably 70 to 130%, more preferably 70 to 100% of the width RW of the rim well 12.

The dampers 5 can be fixed to the wheel rim by means of screws and the like in addition to the above-mentioned adhesive agents and pressure sensitive adhesive double coated tape.

Comparison Test 3:

Using the above-mentioned 195/65R15 tire and 15X6JJ wheel rim, various tire-and-rim assemblies were prepared, changing the arrangement of the lawn-like dampers. Then the assemblies were tested as follows:

Noise Test:

A Japanese 2000 cc FR passenger car provided with a test assembly was coasted at a speed of 60 km/hr on a rough asphalt road for measuring tire noise, and the noise in dB was measured at the driver's seat with a noise meter through a narrow band-pass filter tuned to the primary mode frequency of the air resonance. (Tire pressure 200 KPa) The results are indicated by a difference from Ref.

Rim Mounting Test:

A skilled worker did rim mounting operations by hand, and the mounting operations were evaluated. In the tables 1 and 2, "A" means that the rim mounting operation was the same as Ref., "B" means that it was a little difficult to mount the tire on the rim, and "C" means that it was very difficult to mount the tire on the rim.

TABLE 1

(Lawn-like damper: FIG. 11)

| Tire | Ref | 1 | 2 | 3 | 4 | 5 | 6 | 7 | 8 | 9 |
|---|---|---|---|---|---|---|---|---|---|---|
| Number of dampers | | 8 | 8 | 8 | 8 | 8 | 8 | 8 | 8 | 8 |
| Av. length L (mm) | | 25 | 10 | 15 | 20 | 25 | 25 | 25 | 25 | 25 |
| Width W (mm) | | 80 | 80 | 80 | 80 | 80 | 80 | 80 | 80 | 20 |
| Area (sq. cm) | | 128 | 128 | 128 | 128 | 32 | 64 | 96 | 160 | 32 |
| Length S (mm) | | 20 | 20 | 20 | 20 | 5 | 10 | 15 | 25 | 20 |
| Test results | | | | | | | | | | |
| Noise (dB) | 0 | −3.5 | −0.2 | −1.9 | −2.8 | −0.1 | −0.3 | −2 | −3.7 | −0.1 |
| Rim mounting | A | A | A | A | A | B | B | A | B | A |

| Tire | 10 | 11 | 12 | 13 | 14 | 15 | 16 | 17 | 18 | 19 |
|---|---|---|---|---|---|---|---|---|---|---|
| Number of dampers | 8 | 8 | 8 | 8 | 2 | 4 | 6 | 10 | 12 | 14 |
| Av. length L (mm) | 25 | 25 | 25 | 25 | 25 | 25 | 25 | 25 | 25 | 25 |
| Width W (mm) | 40 | 60 | 90 | 100 | 80 | 80 | 80 | 80 | 80 | 80 |
| Area (sq. cm) | 64 | 96 | 144 | 160 | 32 | 64 | 96 | 160 | 192 | 224 |
| Length S (mm) | 20 | 20 | 20 | 20 | 20 | 20 | 20 | 20 | 20 | 20 |
| Test results | | | | | | | | | | |
| Noise (dB) | −1.3 | −2 | −3.9 | −4.1 | −0.3 | −1.5 | −2.6 | −3.9 | −4.3 | −4.4 |
| Rim mounting | A | A | A | B | A | A | A | A | A | B |

TABLE 2

(Lawn-like damper: FIG. 12)

| Tire | Ref | 20 | 21 | 22 | 23 | 24 | 25 | 26 | 27 | 28 | 29 | 30 |
|---|---|---|---|---|---|---|---|---|---|---|---|---|
| Av. length L (mm) | | 25 | 10 | 15 | 20 | 25 | 25 | 25 | 25 | 25 | 25 | 25 |
| Width W | | 25 | 20 | 20 | 20 | 20 | 5 | 10 | 15 | 30 | 35 | 40 |
| Area (sq.cm) | | 275 | 220 | 220 | 220 | 220 | 55 | 110 | 165 | 330 | 385 | 440 |
| Test results | | | | | | | | | | | | |
| Noise (dB) | 0 | −2.2 | −0.1 | −0.5 | −1.6 | −1.9 | −0.1 | −0.1 | −1 | −3 | −3 | −3.1 |
| Rim mounting | A | A | A | A | A | A | A | A | A | A | A | B |

From the test results, it was confirmed that the air resonance of the tire cavity can be effectively damped in the present invention.

As described above, in the tire and rim assemblies according to the present invention, air resonance of the tire cavity can be effectively controlled to reduce road noise without sacrificing the rim mounting operations and working efficiency.

What is claimed is:

1. A pneumatic tire comprising:

a tread protion, a pair of sidewall portions, a pair of bead portions, wherein lawn-like materials are provided on an inner surface of the tire facing a tire cavity, each said lawn-like material is a split yarn or a monofilament yarn which is made of an elastic synthetic resin, and said lawn-like materials are bristled on one side of a base made of a sheet of an elastic material.

2. The pneumatic tire according to claim 1, wherein the lawn-like materials are provided on an inner surface of the tread portion.

3. The pneumatic tire according to claim 1, wherein the lawn-like materials have an average length in the range of from 10 to 45 mm.

4. The pneumatic tire according to claim 2, wherein the lawn-like materials have an average length in the range of from 10 to 45 mm.

5. The pneumatic tire according to claim 1, wherein a bristle density, which is defined as the weight in kg of the lawn-like materials per a unit area of one square meter, is in the range of from 0.5 to 1.5 kg/m$^2$.

6. The pneumatic tire according to claim 2, wherein a bristle density, which is defined as the weight in kg of the lawn-like materials per a unit area of one square meter, is in the range of from 0.5 to 1.5 kg/m$^2$.

7. The pneumatic tire according to claim 2, wherein the lawn-like materials and base are provided as a plurality of strips which are arranged at regular pitches in the tire circumferential direction, inclining at the same angles with respect to the tire axial direction.

8. The pneumatic tire according to claim 2, wherein the lawn-like materials and base are provided as a long strip extending around the tire continuously in the tire circumferential direction.

9. The pneumatic tire according to claim 1, wherein said elastic synthetic resin is polypylene, nylon, polyethylene or vinylidene chloride.

10. The pneumatic tire according to claim 1, wherein said elastic material is polypropylene or polyester.

* * * * *